No. 831,748. PATENTED SEPT. 25, 1906.
H. A. SCHALK.
PROCESS OF FERMENTING WORT.
APPLICATION FILED APR. 17, 1906.

Witnesses:
Arthur Zumpe.
William Schulz.

Inventor:
Hermann A. Schalk
by Francke Briesen Att'y.

THE NORRIS PETERS CO., WASHINGTON, D. C.

UNITED STATES PATENT OFFICE.

HERMANN A. SCHALK, OF NEW YORK, N. Y.

PROCESS OF FERMENTING WORT.

No. 831,748.    Specification of Letters Patent.    Patented Sept. 25, 1906.

Application filed April 17, 1906. Serial No. 312,107.

*To all whom it may concern:*

Be it known that I, HERMANN A. SCHALK, a citizen of the United States, residing at New York city, Manhattan, county and State of New York, have invented new and useful Improvements in Processes of Fermenting Wort, of which the following is a specification.

This invention relates to improved means for fermenting wort within a cycle of fermenting-tubs, whereby the fermenting process is simplified and expedited and numerous other advantages hereinafter specified are obtained.

Figure 1:
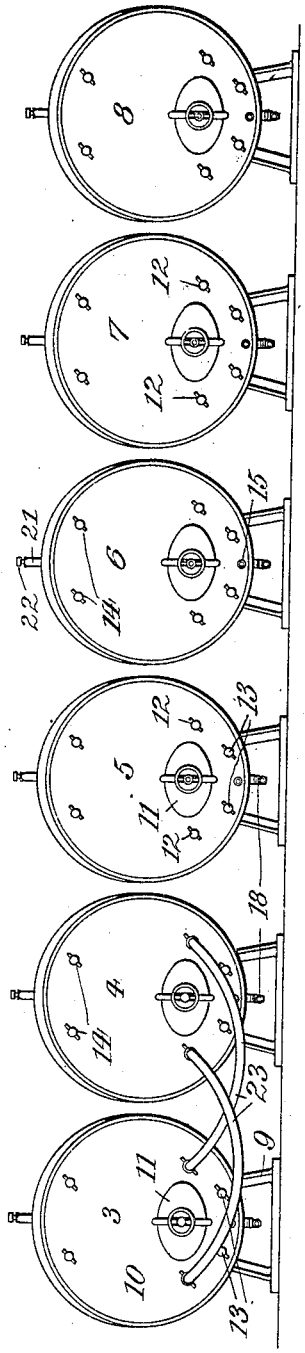
Figure 2:
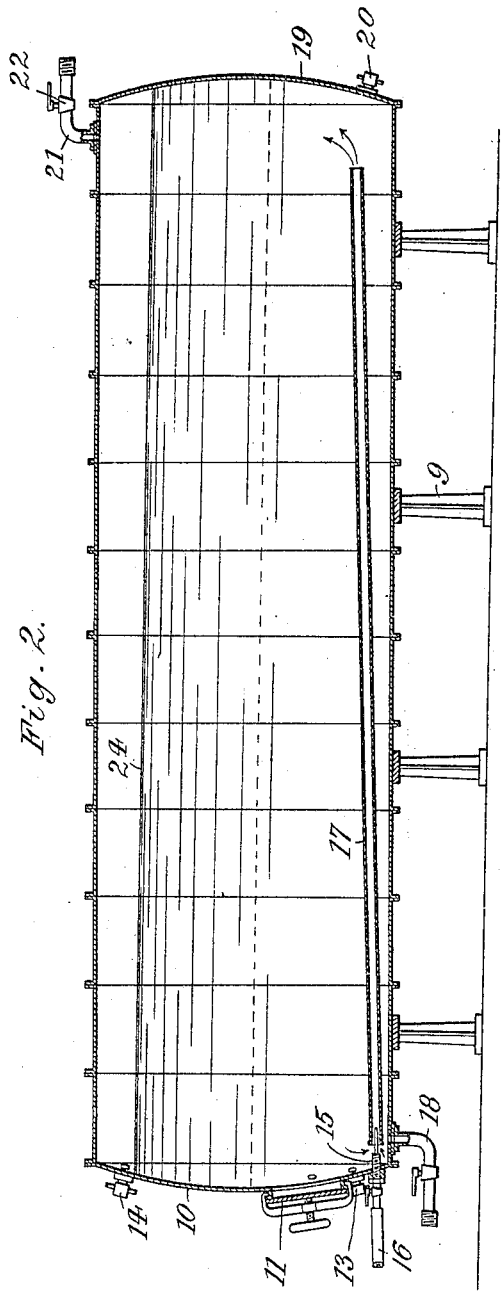

In the accompanying drawings, Figure 1 is a front view of an apparatus for carrying my invention into effect, and Fig. 2 a longitudinal section of one of the tubs.

A series of fermenting-tubs 3 4 5 6 7 8 made, preferably, of wood or enameled steel are installed in the fermenting-cellar side by side, each fermenting-tub being of sufficient size to accommodate the entire brew of one day. The tubs are of cylindrical form and are mounted on supports 9 in a substantially horizontal position, having, however, a slight forward dip, as shown.

The front head 10 of each tub is provided with a manhole and cover 11 and with one or two spring-valves 12, located at about one-quarter the height of the beer in the tub. It is further provided with one or two lower spring-valves 13, arranged slightly above the bottom, and with one or more removable observation-glasses 14 above the liquid-level. Through the bottom of head 10 enters the aerating cock or nozzle 15 of a compressed-air pipe 16, which projects into the forward end of an inclined tube 17. This tube is arranged longitudinally within the tube and is open at both ends. The bottom of the tub is provided near its forward end with a wash-out nipple 18.

The rear head 19 may be provided with one or more spring-valves 20, that coöperate with valves 13 for rapidly emptying the tub. A combined air-inlet and gas-outlet nozzle 21, having cock 22, connects with the upper rear end of the tub above the liquid-level.

The operation is as follows: The unfermented wort prepared on the first day is run into tub 3 and pitched with yeast. After eighteen to forty-eight hours (depending upon the temperature of the beer and the quantity of yeast used) when the yeast has begun to grow and multiply tub 3 is half emptied into tub 4 through spring-valves 12 and hose-couplings 23. The wort prepared on the second day is then run into tub 3 and also into tub 4 to fill both tubs to about the level 24. The yeast will thus again vigorously multiply and develop in the tubs. After again eighteen to forty-eight hours tub 4 is half emptied into tub 5, and tubs 4 and 5 are filled up with the unfermented wort prepared on the third day. This operation is continued successively for tubs 6, 7, and 8, half of the fermented contents of the last tub being run into tub 3, which has previously been emptied, as hereinafter described. In this way a complete cycle is established, each tub serving to produce the beer for one of the days of a week. Of course the number of tubs may be varied according to the duration of the fermentation and the output of the brewery. After a tub—say tub 3—has been half emptied of the fermented liquid and filled up with fresh brew in the manner described the beer is aerated during the first two days by forcing pure air through nozzle 15 into tube 17. The air should enter tube 17 under about twenty pounds pressure, so that the tube acts similarly to an injector. The wort is thus drawn into the mouth of the tube, becomes mixed with the air, and escapes at the back of the tube. In this way there is created a lively circulation of the wort and an intimate and uniform mixture of wort and air, thus producing perfect aeration of the beer. On the third and fourth days the cock 22 is opened to permit the carbonic-acid gas generated to escape, while during the last two days the observation-glasses 14 are removed and the nipple 21 is coupled to a purified-air supply. Pure air is now forced through nipple 21 into the tub to pass over the surface of the beer, while the last carbonic-acid gas is ejected through the openings of the observation-glasses 14. The fermentation being now completed, the tub is emptied through valves 13 and 20 and is washed out through nozzle 18 As the tub inclines from the rear toward the front the yeast and the washing-water can be easily removed through this nozzle.

The contents of tub 4 are on the next day subjected to the treatment described, and so on through the entire series, so that each tub furnishes the beer for one day of the week, as desired.

The advantages connected with my improved process are numerous. By the employment of horizontal tubs a practically unlimited quantity of beer can be fermented at a time, which is not the case with vertical tubs, because with the latter the height of the beer column materially affects the fermentation and clarification. Horizontal tubs, on the other hand, can be built of any length desired, while the height may remain the same. The wort, on account of its low level, is quickly fermented, the beer clarifies more rapidly, and but a single pitching with yeast is required. As long as no infection manifests itself the same yeast can be carried along for months and years. The best and most vigorous yeast only is transferred from tub to tub, owing to the location of valves 12 at one quarter the height of the beer-level. The aeration of the wort is exceedingly intense and uniform, insuring a quick start and vigorous development of the fermentation and keeping the yeast pure. As the wort runs from one tub into another by gravity, all pumping is done away with, and the number of men required for duty in the fermenting-cellar is reduced to a minimum.

What I claim is—

1. Process for the continuous fermentation of wort by means of a battery of tubs, which consists in conveying part of fermented wort successively from one tub to the next tub, and filling up the partly-filled tubs with unfermented wort, substantially as specified.

2. A step in the process of fermenting wort, which consists in effecting fermentation of unfermented wort successively in a cycle of tubs, discharging part of the fermented wort, from one tub into the succeeding tub, and filling up the partly-filled tubs with unfermented wort, substantially as specified.

3. A process of fermenting wort, which consists in effecting fermentation of unfermented wort in a tub by the addition of yeast, drawing off part of the wort when fermented, filling up the tub with unfermented wort, to produce a new fermentation, aerating the beer, liberating the carbonic-acid gas evolved, and forcing air over the surface of the beer, substantially as specified.

4. A process of fermenting wort, which consists in effecting fermentation of unfermented wort successively in a cycle of tubs, discharging part of the fermented wort from one tub into the succeeding tub, filling up the partly-filled tubs with unfermented wort, and successively subjecting the contents of the tubs to aeration and the action of surface air, substantially as specified.

Signed by me at New York city, (Manhattan,) New York, this 12th day of April, 1906.

HERMANN A. SCHALK.

Witnesses:
 GEORGE HINKEL, Jr.,
 GEORGE E. RUPPERT.